United States Patent Office 3,194,775
Patented July 13, 1965

3,194,775
FLOORING MATERIALS
Francis John Woodford Bartlett, Vails Gate, N.Y., assignor to The Ruberoid Co., a corporation of New Jersey
No Drawing. Filed Oct. 16, 1962, Ser. No. 231,038
9 Claims. (Cl. 260—28.5)

This invention relates to flooring materials and, more particularly, to grease-resistant floor tiles which conform to the rigid specifications set forth in Federal Specifications SS–T–307 and L–T–751. The invention is based on the discovery that by incorporating relatively minor amounts of either chlorinated polyethylenes or chlorosulfonated polyethylenes in a grease-resistant flooring composition which contains a relatively high proportion of chlorinated paraffin and a vinyl polymer or copolymer as the binder system, it is possible to improve the flexibility and physical properties of the flooring composition without diminishing its grease resistance or flame retardant properties.

Until the development which culminated in the issuance of the Church Patent No. 3,005,791, granted October 24, 1961, grease-resistant floor tiles which conformed to Federal Specification SS–T–307 were both difficult and costly to produce and, consequently, were available to the public only at relatively high prices. This development led to an improved, low-cost, curl-proof, grease-resistant flooring material which conformed to all Federal specifications for grease-resistant tile. Basically, the unique flooring composition described in the Church patent was composed of an organic binder containing a vinyl polymer or copolymer and a chlorinated paraffin in certain predetermined ratios, throughout which organic binder was dispersed relatively large amounts of inexpensive fillers, such as ground limestone, asbestos fiber and various pigments. Because this particular organic binder was found to possess a high degree of wetting power and excellent grease resistance, it could be combined with the inexpensive filler to yield a highly serviceable, curl-proof, grease-resistant flooring material which conformed to each of the specifications listed in Federal Specification SS–T–307.

Although the use of chlorinated paraffins in conjunction with vinyl resins in this flooring composition produces the desired grease resistance as well as flame retardant and wear-resistant properties, chlorinated paraffins insufficiently plasticize the organic binder system so that the resultant flooring composition lacks a high degree of flexibility. This defect may be remedied by incorporating other plasticizers in the organic binder, such as dioctyl phthalate, but the improvement in flexibility is accompanied by a corresponding reduction in the elasticity of the floor covering which, in turn, adversely affects the hardness of the covering and induces poor indention qualities. Moreover, the use of such conventional plasticizers in the composition frequently causes a tacky surface to appear on the floor covering which ultimately results in rapid soiling of the surface.

Using a basic flooring composition which is similar to that described in the aforementional Church patent, I have found that by incorporating from about 0.5 to about 5 percent by weight of chlorinated polyethylenes or chlorosulfonated polyethylenes (or both) in this composition, it is possible to produce a flooring material which possesses excellent grease-resistance and high flexibility without any diminution in its degree of hardness or loss in its resistance to indention, and which also possesses excellent flame retardant properties. Flooring compositions made in accordance with the invention have been found to consistently conform to all of the rigid requirements set forth in both Federal Specifications SS–T–307 and L–T–751.

Based on this discovery the invention provides an improved grease resistant floor tile composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 80 to about 95 percent by weight of vinyl chloride based on its weight, the ratio of chlorinated paraffin to copolymer in the organic binder being from about 1.5:1 to about 4:1; (b) from about 0.5 to about 5 percent by weight of a substituted polyethylene selected from the group consisting of chlorinated polyethylenes and chlorosulfonated polyethylenes; and (c) between 81.5 and 70 percent by weight of inorganic fillers.

The chlorinated paraffin which is used to prepare the organic binder must contain between about 45 and about 71 percent by weight of chlorine in its molecular structure and have a melting point from about 15° C. to about 55° C. Chlorinated paraffins within this range are readily obtainable commercially or may be prepared by the chlorination of crude petroleum wax (approximately the composition $C_{20}H_{42}$), using standard chlorination techniques. Although the chlorinated paraffin may be used in the organic binder over a wide range of concentrations, particularly satisfactory results have been obtained by using a weight ratio of chlorinated paraffin to vinyl copolymer in the range from about 1.5:1 to about 4:1.

The vinyl copolymer employed in the organic binder system is prepared by copolymerizing vinyl chloride with either vinyl acetate or vinylidene chloride (or both to form the terpolymer) in such manner that the copolymer contains from about 80 to about 95 percent by weight of vinyl chloride based on the weight of the copolymer or terpolymer. Particularly satisfactory results have been obtained by using vinyl chloride-vinyl acetate copolymers or vinyl chloride-vinylidene chloride copolymers in which the vinyl chloride constitutes between 85 and 90 percent by weight.

The improved flexibility of the flooring material of the invention is primarily due to the incorporation of from about 0.5 to about 5 percent by weight (based on the total weight of the composition) of either chlorinated polyethylenes or chlorosulfonated polyethylenes, both of which are commercially available, the former under such trademarks as "LD–184" and the latter under such trademarks as "Hypalon 20." In general, the chlorinated polyethylene is prepared by chlorinating low pressure polyethylenes until the product contains from about 10 to about 60 percent by weight of chlorine in its structure, although a very wide range of combinations of molecular weight and degree of chlorination may be employed. The chlorosulfonated polyethylenes are prepared by the chlorosulfonation of polyethylene and are readily available from E. I. du Pont de Nemours and Company. For best results and maximum flexibility, the chlorinated polyethylenes or chlorosulfonated polyethylenes should be used in the range from about 1.5 to about 2.5 percent by weight of the flooring composition.

The following examples are illustrative of the effectiveness with which chlorinated polyethylenes or chlorosulfonated polyethylenes may be used to improve the flexibility of grease-resistant flooring compositions in accordance with the invention.

EXAMPLE I

Tile compositions both with and without chlorinated polyethylenes were formulated in accordance with the following formulae:

| Component | Formula A (percent) | Formula B (percent) |
|---|---|---|
| Chlorinated paraffin | 13.40 | 11.67 |
| Vinyl copolymer | 5.96 | 5.19 |
| Chlorinated polyethylene | | 2.50 |
| Stabilizer | 0.322 | 0.322 |
| Calcium tallate | 0.642 | 0.642 |
| Limestone | 57.768 | 57.768 |
| Stearic acid | 0.121 | 0.121 |
| Asbestos | 19.846 | 19.846 |
| Polymerized rosin | 1.936 | 1.936 |

Table I sets forth the physical properties of both tile compositions, only one of which (Formula B) contained the chlorinated polyethylene, when tested in accordance with Federal Specification SS-T-307.

Table I

| Property | Formula A | Formula B |
|---|---|---|
| One-minute penetration (mils) | 6.8 | 10.0 |
| Ten-minute penetration (mils) | 9.8 | 14.3 |
| Ten-minute maximum (mils) | 10.4 | 14.9 |
| Indentation at 115° F. (mils) | 23.0 | 27.8 |
| Deflection (flexibility) | 1¾ | 3″+ |
| Impact | (¹) | (²) |

¹ Broke on second drop.
² Did not crack.

The impact test on Federal Specification SS-T-307 is to drop a 0.143 lb. weight, once from a height of 4½″. The impact test reported is from L-T-00345, which is for vinyl asbestos tile. This consists of dropping a 0.143 lb. weight from a 20″ height for four impacts.

EXAMPLE II

Chlorosulfonated polyethylenes may also be used to improve the flexibility of the flooring composition in accordance with the invention. Tile compositions both with and without chlorosulfonated polyethylenes were formulated in accordance with the following formulae:

| Component | Formula C (percent) | Formula D (percent) |
|---|---|---|
| Organic binder ¹ | 15.077 | 13.185 |
| Vinyl copolymer ² | 4.221 | 4.221 |
| Alkyl aryl phosphate plasticizer | 1.507 | 1.507 |
| Calcium tallate | 0.301 | 0.301 |
| Stabilizer | 0.301 | 0.301 |
| Wax | 0.188 | 0.188 |
| Polymerized rosin | 0.904 | 0.904 |
| Chlorosulfonated polyethylene | | 2.590 |
| Limestone | 46.754 | 46.754 |
| Asbestos | 27.139 | 27.139 |
| Titanium dioxide | 3.000 | 3.000 |
| Polystyrene | 0.608 | |

¹ Organic binder contained chlorinated paraffin and vinyl copolymer in ratio of 2.25 parts of chlorinated paraffin to 1 part of vinyl copolymer.
² Vinyl copolymer consists of about 87% vinyl chloride, 13% vinyl acetate.

Table II sets forth the physical properties of these two compositions, which differ essentially only in that Formula C contained a low molecular weight polystyrene while Formula D contained a chlorosulfonated polyethylene, when tested by Federal Specification SS-T-307.

Table II

| Property | Formula C | Formula D |
|---|---|---|
| One-minute penetration (mils) | 6.9 | 9.8 |
| Ten minute penetration (mils) | 9.0 | 13.3 |
| Ten-minute maximum (mils) | 10.5 | 14.7 |
| Indentation at 115° F. (mils) | 18.6 | 25.0 |
| Deflection (flexibility) | 3″+ | 3″+ |
| Impact at 77° F | Just passed VA Test. | Passed VA Test. |
| Impact at 40° F | Failed VA Test. | Do. |
| Impact at 20° F | do | Do. |

The impact test described in Federal Specification L-T-00345 for vinyl asbestos floor tile was used. The term "VA Test" in the foregoing table refers to such test.

EXAMPLE III

Various concentrations of both chlorinated polyethylenes and chlorosulfonated polyethylenes are effective in improving the flexibility of flooring compositions in accordance with the invention. Table III sets forth the formulae of six different flooring compositions, four of which (Formulas E through H inclusive) contain chlorinated polyethylenes while the remaining two (Formulas I and J) contain chlorosulfonated polyethylenes.

Table III

| Component | Formula (percent) | | | | | |
|---|---|---|---|---|---|---|
| | E | F | G | H | I | J |
| Binder ¹ | 14.635 | 15.077 | 14.635 | 15.077 | 14.635 | 15.077 |
| Vinyl copolymer | 4.098 | 4.221 | 4.098 | 4.221 | 4.098 | 4.221 |
| Dioctyl phthalate | 1.170 | 1.808 | 1.170 | 1.808 | 1.170 | 1.808 |
| Stabilizer | 0.292 | 0.301 | 0.292 | 0.301 | 0.292 | 0.301 |
| Paraffin wax | 0.182 | 0.188 | 0.182 | 0.188 | 0.182 | 0.188 |
| Chlorinated polyethylene | 1.756 | 0.603 | 2.500 | 2.500 | | |
| Chlorosulfonated polyethylene | | | | | 2.500 | 2.500 |
| Polymerized rosin | 0.878 | 0.904 | 0.878 | 0.904 | 0.878 | 0.904 |
| Limestone | 48.518 | 46.754 | 47.779 | 44.862 | 47.779 | 44.862 |
| Asbestos | 28.466 | 30.139 | 28.466 | 30.139 | 28.466 | 30.139 |

Table IV sets forth the physical properties of the flooring compositions listed in Table III, which properties were determined in accordance with the test specifications described in Federal Specification SS-T-307. In each case, the incorporation of a relatively minor amount of either a chlorinated polyethylene or a chlorosulfonated polyethylene in the flooring composition resulted in a high degree of flexibility without any significant diminution in the degree of hardness of the product. As before, the impact test described in Federal Specification L-T-00345 for vinyl asbestos floor tile was used.

Table IV

| Physical property | Formula | | | | | |
|---|---|---|---|---|---|---|
| | E | F | G | H | I | J |
| One-minute penetration (mils) | 6.8 | 8.1 | 7.3 | 8.4 | 8.6 | 9.4 |
| Ten-minute penetration (mils) | 9.0 | 10.8 | 9.0 | 10.6 | 10.8 | 12.5 |
| Ten-minute maximum allowable penetration (mils) | 10.4 | 12.8 | 11.0 | 12.5 | 12.9 | 14.2 |
| Rate | −1.4 | −2.0 | −2.0 | −1.9 | −2.1 | −1.7 |
| Deflection (flexibility) | 3″+ | 3″ | 3″ | 3″+ | 3″+ | 3″+ |
| Impact (size of crack, inches) | ¼″ | 2½″ | 1¼″ | ½″ | None | ¼″ |

I claim:
1. A grease-resistant floor tile conforming to Federal Spesification SS-T-307 and L-T-751 and composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 80 to about 95 percent by weight of vinyl chloride based on its weight, the ratio of chlorinated paraffin to copolymer in the organic binder being from about 1.5:1 to about 4:1; (b) from about 0.5 to about 5 percent by weight of a substituted polyethylene selected from the group consisting of chlorinated polyethylenes and chlorosulfonated polyethylenes; and (c) between 81.5 and 70 percent by weight of inorganic fillers.

2. A grease-resistant floor tile conforming to Federal Specifications SS-T-307 and L-T-751 and composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 80 to about 95 percent by weight of vinyl chloride based on its weight, the ratio of chlorinated paraffin to copolymer in the organic binder being from about 1.5:1 to about 4:1; (b) from about 0.5 to about 5 percent by weight of a chlorinated polyethylene; and (c) between 81.5 and 70 percent by weight of inorganic fillers.

3. A grease-resistant floor tile conforming to Federal Specifications SS-T-307 and L-T-751 composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 80 to about 95 percent by weight of vinyl chloride based on its weight, the ratio of chlorinated paraffin to copolymer in the organic binder being from about 1.5:1 to about 4:1; (b) from about 0.5 to about 5 percent by weight of a chlorosulfonated polyethylene; and (c) between 81.5 and 70 percent by weight of inorganic fillers.

4. A grease-resistant floor tile conforming to Federal Specifications SS-T-307 and L-T-751 composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 80 to about 95 percent by weight of vinyl chloride based on its weight, the ratio of chlorinated paraffin to copolymer in the organic binder being from about 1.5:1 to about 4:1; (b) from about 1.5 to about 2.5 percent by weight of a substituted polyethylene selected from the group consisting of chlorinated polyethylenes and chlorosulfonated polyethylenes; and (c) between 81.5 and 70 percent by weight of inorganic fillers.

5. A grease-resistant floor tile conforming to Federal Specifications SS-T-307 and L-T-751 and composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 85 to about 90 percent by weight of vinyl chloride based on its weight, the ratio of chlorinated paraffin to copolymer in the organic binder being from about 1.5:1 to about 4:1; (b) about 1.5 to about 2.5 percent by weight of a substituted polyethylene selected from the group consisting of chlorinated polyethylenes and chlorosulfonated polyethylenes; and (c) between 81.5 and 70 percent by weight of inorganic fillers.

6. A grease-resistant floor tile conforming to Federal Specifications SS-T-307 and L-T-751 and composed of (a) from about 18.5 to about 30 percent by weight of an organic binder comprising (i) a chlorinated paraffin containing between about 45 and about 71 percent by weight of chlorine in its molecule and having a melting point from about 15° to about 55° C., and (ii) a copolymer of vinyl chloride and an olefinic monomer selected from the group consisting of vinyl acetate and vinylidene chloride, said copolymer containing about 85 to about 90 percent by weight of vinyl chloride based on its weight, the ratio of chlorinated paraffin to copolymer in the organic binder being from about 1.5:1 to about 4:1; (b) from about 1.5 to about 2.5 percent by weight of a chlorinated polyethylene; and (c) between 81.5 and 70 percent by weight of inorganic fillers.

7. A grease-resistant floor tile conforming to Federal Specifications SS-T-307 and L-T-751 and composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and an olefinic monomer selected from the group consisting of vinyl acetate and vinylidene chloride, said copolymer containing about 85 to about 90 percent by weight of vinyl chloride based on its weight, the ratio of chlorinated paraffin to copolymer in the organic binder being from about 1.5:1 to about 4:1; (b) from about 1.5 to about 2.5 percent by weight of a chlorosulfonated polyethylene; and (c) between 81.5 and 70 percent by weight of inorganic fillers.

8. A grease-resistant floor tile conforming to Federal Specifications SS-T-307 and L-T-751 and composed of (a) from about 18.5 to about 30 percent by weight of an organic binder comprising (i) a chlorinated paraffin containing between about 45 and about 71 percent by weight of chlorine in its molecule and having a melting point from about 15° C. to about 55° C., and (ii) a copolymer of vinyl chloride and vinyl acetate, said copolymer containing about 85 to about 90 percent by weight of vinyl chloride based on its weight, the ratio of chlorinated paraffin to copolymer in the organic binder being from about 1.5:1 to about 4:1; (b) from about 1.5 to about 2.5 percent by weight of a substituted polyethylene selected from the group consisting of chlorinated polyethylenes and chlorosulfonated polyethylenes; and (c) between 81:5 and 70 percent by weight of inorganic fillers.

9. A grease-resistant floor tile conforming to Federal Specifications SS-T-307 and L-T-751 as defined in claim 1, in which the inorganic fillers are mainly calcium carbonate admixed with asbestos.

References Cited by the Examiner

Smith: Vinyl Resins, Reinhold Publishing Corp., New York, 2nd printing (1958), pages 190–195.

Polythene, Renfrew et al., Interscience Publishers, Inc., New York, 2nd edition, pages 394–396, 402 (1960).

MORRIS LIEBMAN, *Primary Examiner.*